O. L. CASTLE.

Calculator.

No. 551. Reissued May 11, 1858.

FOR ARCHIVAL USE

UNITED STATES PATENT OFFICE.

O. L. CASTLE, OF UPPER ALTON, ILLINOIS.

PREPARED ARITHMOMETER FOR ADDING.

Specification forming part of Letters Patent No. 18,675, dated November 24, 1857; Reissue No. 551, dated May 11, 1858.

*To all whom it may concern:*

Be it known that I, O. L. CASTLE, of Upper Alton, in the county of Madison and State of Illinois, have invented a new and useful Machine for the Addition of Numbers, which I denominate an Arithmometer; and I do hereby declare that the following is a full, clear, and exact description of the same, reference being had to the accompanying drawings, making a part of this specification, in which—

Figure 3:
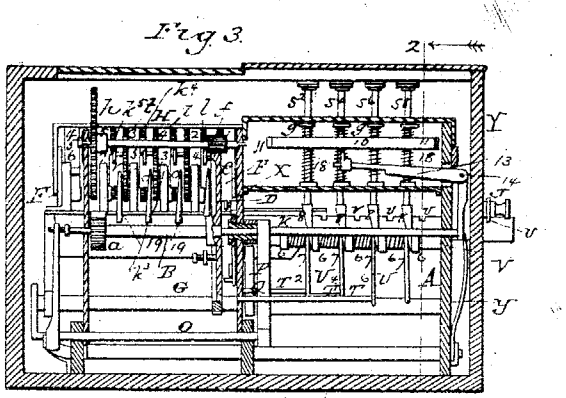
Figure 2:
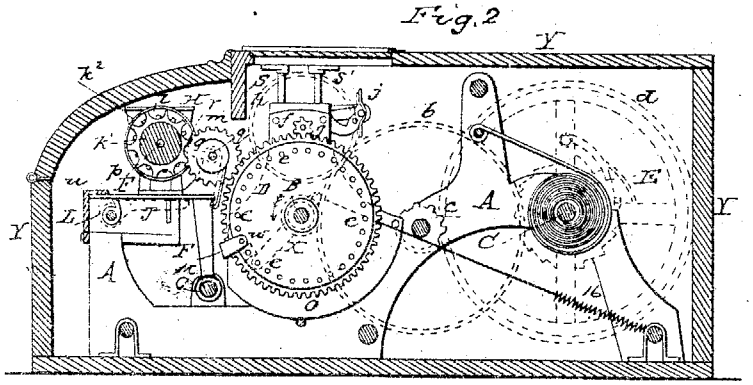
Figure 4:
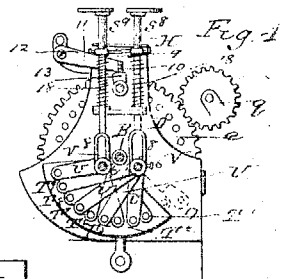
Figure 5:
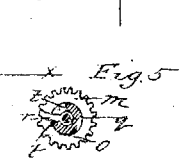
Figure 1:
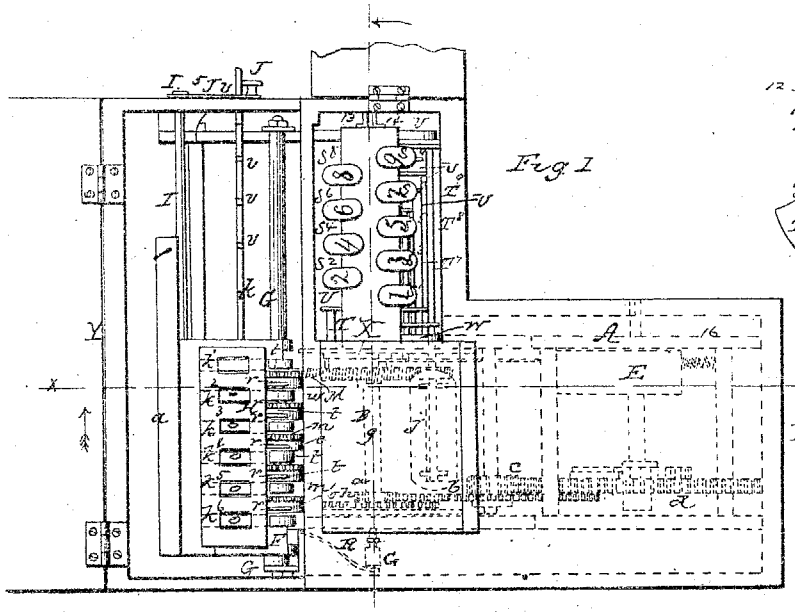

Figure 1 is a plan of the machine. Fig. 2 is a vertical section of the same in line *x x* of Fig. 1. Fig. 3 is a vertical section of the same in line * * of Fig. 1. Fig. 4 is a vertical section of part of the machine in the line Z Z of Fig. 3, as seen looking in the direction of the arrow shown near that line. Fig. 5 is a detail view.

Similar letters of reference indicate corresponding parts in the several figures.

A is the framing of the machine. D is a spur-wheel, which I call the "driving wheel," secured to a long horizontal shaft, B, which is fitted to bearings in the framing A, in which bearings the said shaft is capable of a limited longitudinal sliding movement. This shaft B is geared by a train of wheel-work *a b c d* with a shaft, C, to which a clock-spring, E, is applied in such a manner as to give motion to the driving-wheel D in the direction of the arrow shown upon it in Fig. 2, and the driving-wheel D is geared by a pinion, *f*, shaft *g*, wheel *h*, and pinion *i*, with a flier, *j*, which serves to regulate its motion. The driving-wheel D serves to give some motion to a train of registering-wheels which are secured in a frame, F, that is capable of swinging and also sliding longitudinally on a stationary horizontal arbor, G, that is arranged near the bottom of the machine, parallel with shaft B. The frame F, which carries the registering-wheels, with all its attached parts, taken collectively, are hereinafter included in the term "register," whenever it is employed.

$k^1$ $k^2$ $k^3$ $k^4$ $k^5$ $k^6$ are the registering-wheels, of which there are six shown, but a greater or less number may be used, said wheels being arranged side by side to turn freely and independently of each other upon a fixed shaft, *p*, secured in the register-frame F, and having their peripheries divided circumferentially into ten equal spaces, marked with numerals from 0 to 9.

H is a plate secured to the register-frame F, to stand above the registering-wheels, and containing six openings, through which one of the numbers of each of the registering-wheels is visible. Every one of the registering-wheels, with the exception of $k^6$, has a spur-wheel, *l*, attached firmly to it to gear with one of a series of five wheels, *m m*, of similar size, which I term "secondary driving-wheels," which are arranged to turn freely independently of each other upon a fixed shaft, *q*, which is so arranged that by sliding the register-frame along the arbor G either of the said wheels *m m* may be brought into gear with the driving-wheel D.

Each of the registering-wheels except $k^1$ has secured to it another spur-wheel, *n*, of ten teeth, and each of the secondary driving-wheels *m* has attached to one side of it a wheel, *o*, with a single tooth, *r*, intended to gear with one of the spur-wheels *n*. The teeth *r* are fitted loosely to the wheels *o*, each tooth being at the extremity of a tongue, *s*, which is fitted to the shaft *q* within its respective wheel *o* in such a manner as to be capable of swinging to the extent of nearly a quarter of a revolution within a slot, *t*, provided in the wheel to receive it, as shown in Fig. 5, which is a section perpendicular to the axis of one of the wheels *o*. The tongue comes to a rigid condition against either end of the slot *t*. The wheels *o* have friction-springs 19 applied to prevent them and the wheels *m m* slipping back or moving independently of the driving-wheel D, when not geared directly with the latter.

I is a shaft working in fixed bearings in the back part of the stationary framing A of the machine, and provided at one end with a small crank, J. This shaft I carries a cam, L, by whose action on the register-frame F, when the crank is thrown over in a forward direction, as indicated by the arrow 5 shown in Figs. 1 and 2, the register-frame is thrown forward so as to bring either one of the secondary driving-wheels *m m* that may at any time be opposite the driving-wheel D into gear with the said driving-wheel. When the crank is thrown over in the opposite direction, the register frame F falls back against a rest, *u*, at the back of the frame A, which draws the secondary driving-wheel out of gear with the driving-wheel D. The register-frame F has a long horizontal bar, K, attached to it, standing parallel with the shaft I and the driving-wheel shaft B, and containing notches *v v*, Figs. 2 and 3, corresponding in number with the secondary driving-wheels *m m*, and arranged at the same distances apart as and in such relation to said wheels that, by sliding the register-frame F along the arbor G, to bring the proper notch *v* into a position to receive the crank J when it is thrown forward, either of the secondary driving-wheels may be brought into gear with the wheel D.

*w* is a pin secured in a stationary bracket, M, attached to the framing, said pin being arranged to serve as a stop to hold the driving-wheel D stationary at all times except while the machine is in actual operation, by entering one of a series of holes, *e e*, in the said wheel, which are arranged equidistantly in a circle concentric to the axis of the said wheel.

N is a horizontal sliding rod arranged in line with the shaft B of the driving-wheel, in suitable guides in the framing A. *y* is a spring attached to one side of the framing, as shown in Fig. 3, and pressing against the outer end of the rod N to force it against the end of the shaft B of the driving-wheel, and having the effect of forcing the driving-wheel toward the stop-pin *w*, so that said pin, when opposite one of the holes *e e* in the driving-wheel, may be retained therein to stop the wheel.

O is a horizontal sliding rod arranged in guides in the framing below and parallel with shaft B, and connected at one end, as shown in Fig. 3, by an upright arm, P, with the sliding rod N. To the opposite end of this sliding rod O there is secured an arm, Q, which stands up against the end of the shaft B.

R is a spring pressing against the outer end of the rod O, and forcing rod Q against the outer end of shaft B, and thereby exerting a pressure upon the said shaft in opposition to the spring *y*, and also, through the agency of the arm P, pushing the rod N in opposition to the spring *y*. This spring R is, however, of less strength than the spring *y*, and therefore cannot operate upon shaft B to push the driving-wheel D off the stop-pin *w* till the said shaft is relieved of the pressure of the spring *y*.

$S'$ $S^2$ $S^3$ $S^4$ $S^5$ $S^6$ $S^7$ $S^8$ $S^9$ are series of upright keys, sliding vertically in guides in the framing A, and numbered from 1 to 9. These keys are for the purpose of relieving the shaft B of the pressure of the spring *y*, and allowing the driving-wheel D to be freed from the stop-pin *w* by the action of the spring R, so that the said wheel may be set in motion by the spring E, to give motion to the registering-wheels. The keys also operate a stop mechanism by which the driving-wheel is stopped when it is moved far enough to cause the registration of the number marked upon the key that has been pressed down. The keys relieve the rod N and shaft B of the pressure of the spring *y* through the following means: Each key has rigidly attached to it a finger, 9, which, by the depression of the key, is caused to bear upon and depress a horizontal bar, 10, which is attached by two arms, 11, to a horizontal rock-shaft, 12; and as this bar 10 is depressed it is caused to bear upon and depress one extremity of an elbow-lever, 13, (see Fig. 3,) which works on a fulcrum, 14, and thus to throw out the other end of the said lever (which is situated between the end of the sliding rod N and the spring *y*) in such a manner as to force away said spring, which leaves the shaft B under the influence of spring R, acting on the sliding bar O and arm Q. The stop mechanism is of the following construction:

$T'$ $T^2$ $T^3$ $T^4$ $T^5$ $T^6$ $T^7$ $T^8$ $T^9$ are a series of horizontal rods, which I call stop-rods, nine in number—viz., one for each key—attached to arms U U, which are fitted to slide on two stationary horizontal bars, V V, five arms on one shaft and four on the other. Two bars, V V, are employed to obviate the necessity of making the stop-rods $T'$ $T^2$, &c., of great length. Otherwise all the arms U U might slide on one bar. The stop-rods $F'$ $F^2$, &c., and the bars V V, are all parallel with the shaft B and rod N, and the stop-rods $T'$ $T^2$, &c., are so arranged that their centers would all be struck by an arc described from a continuation of the axis of the driving-wheel D, as will be understood by reference to Fig. 3. The bars V V are furnished with collars 6 6, which serve as bearings for spiral springs 7 7, which bear against the arms U U for the purpose of pulling back the stop-rods $T'$ $T^2$, &c., within a guide-plate, W, near the driving-wheel D. These collars 6 6 also serve as bearings for pairs of wedges 8 8, attached to the lower extremities of the keys, either of which pairs of wedges, acting between one of the said collars and one of the arms U, is caused, by the depression of its respective key by the fingers of the operator, to slide the said arm U along its respective bar V, and thus to cause the end of its respective stop-rod to be protruded through the guide-plate W, to act as a stop to what I term the "repeater," by whose aid the machine, after registering one number, is returned to a condition for registering another.

X is the "repeater," consisting of a lever of the first order fitted to swing very freely on the shaft B, close to the guide-plate W, through which the stop-rods $T'$ $T^2$, &c., work, and provided at one end with a pin, 15, which is capable—when the influence of the spring *y* is removed from the shaft B, and said shaft with its driving-wheel D are pushed through toward the guide plate W by the action of spring R—of entering one of the holes *e e* in the driving-wheel. The repeater has applied to the opposite end to that which carries the pin 15 a spring, 16, which, when the wheel D is locked by the pin *w*, holds the repeater at rest, as shown in Fig. 1, against a fixed stop,

BEST AVAILABLE COPY 17, attached to the plate W, in which position of the repeater the pin 15 stands opposite one of the holes *e e* of the driving-wheel, and so close to the driving-wheel that as soon as the shaft B is left under the influence of the spring R the driving-wheel, in moving off the stop-pin *w*, engages itself with the repeater-pin 15, and as the driving-wheel moves in the direction of the arrow shown on it in Fig. 2 the repeater is carried with it until the repeater, striking whichever of the stop-rods $T^1$ $T^2$, &c., has been protruded through the plate W, is stopped, and the wheel also. As the stop-rods are at a distance from the stop 17 corresponding with the numbers on their respective keys—viz., that in connection with $T^1$ being the nearest to it, and that in connection with $T^9$ being the farthest from it—the driving-wheel D always moves a distance from the stop 17 corresponding with the number of the key that is depressed, and the distance of the movement of the driving-wheel is registered accurately by the registering apparatus, and the registering-wheel to which the movement of the driving-wheel is first communicated registers the number of the key that has been depressed. The driving-wheel remains stopped by the stop-bar till the pressure of the operator's finger is removed from the key, when the key is caused to rise by the action of one of the number of springs, 18, one of which is applied to each key, and the fingers 9, thus being lifted off the bar 10, allow said bar and the end of the lever 13, on which it rested, to rise, and thus allow the strong spring *y* to come into operation and force the driving-wheel D off the repeater-pin 15, and onto the fixed stop-pin *w*, which is so arranged as to be in readiness to enter one of the holes *e e* in the driving-wheel, as the latter frees itself from the repeater-pin. The instant that the driving wheel is released from the repeater-pin 15, the repeater is left entirely under the influence of the spring 16, which throws it back suddenly against the fixed stop 17, in readiness for the next operation. The rising of the key also releases the stop-bar instantaneously from the action of the wedges 8 8, and allows it to be moved back within the plate W by the action of its spring 7, and hence the instrument is always ready to repeat the operation the instant the finger is relieved from downward pressure.

Having described the construction of the machine and operation of its several parts, I will proceed to explain the mode of adding numbers by it.

Before commencing, the register should be set free of the driving wheel D by turning back the crank J, and the register-wheels turned till every wheel presents its 0 opposite the openings in the plate H, and then the register-frame should be brought forward again with the secondary driving-wheel *m*, belonging to the first or unit-register wheel, $k'$, in gear with the driving wheel D, and should be secured in this position by bringing the crank J into the first notch in the bar K, counting from right hand of Fig. 3. The unit-column is then added by depressing the keys $S'$ $S^2$, &c., one after the other, in the same numerical order as the figures in the column of units to be added; and at every depression of a key the unit register wheel $k'$ is caused to make one, two, or more tenths of a revolution—that is to say, as many tenths as the number indicated on the key depressed; and every time the revolution of the unit-registering wheel is completed and the 0 is brought opposite the opening in the plate H the tooth *r* of the wheel *o*, that is attached to its secondary driving-wheel, gives one-tenth of a revolution to the tens-registering wheel $k^2$, and if the sum of the column of units be sufficient to complete a revolution of the tens-wheel the secondary driving-wheel gearing with the wheel *n*, that is attached to the tens-wheel, receiving motion from said wheel *n*, will bring the tooth *n* of the second wheel *o* into operation on the hundreds-wheel $k^3$. When the units column has been added in the above manner, the crank J is raised out of the notch in the bar K of the register, and the register is thus thrown out of gear with the driving-wheel D, and, without disturbing the register-wheels, the whole of the register-frame is moved far enough to allow the crank J to enter the second notch of the bar K, counting from the right hand of Fig. 3, which brings that secondary driving-wheel *m* which gears with the tens-registering wheel $k^2$ opposite the driving-wheel D, and, on the crank J being thrown forward into the notch, that secondary driving-wheel is brought into gear with D. The addition of a column of tens can then be proceeded with in the same manner as the column of units already supposed to have been added, and the numbers are then registered by $k^2$ in the same manner as they formerly were by $k'$, which is now inoperative, and remains for any length of time in the same condition in which it was left at the termination of the addition of the column of units. The complete revolutions of the wheel $k^2$ are registered by tenth revolutions of $k^3$, and the complete revolutions of the latter by tenth-revolutions of $k^4$, in the manner before described, by the agency of the secondary driving-wheels *m m* and the single-toothed wheels *o o*. When the tens-column has been added, the register may be again shifted to bring the next notch, *v*, in the bar K—viz., the third from the right of Fig. 3—opposite crank J, and the third of the secondary driving-wheels is brought into gear, and the addition of a "hundreds" column of figures is proceeded with, the numbers being registered by the wheel $k^3$, while $k^2$ and $k^4$ both remain undisturbed; and the revolutions of $k^3$ produce tenth revolutions of $k^4$, and the revolutions of $k^4$ produce tenth revolutions of $k^5$. When the hundreds column has been added, the register-frame may be further shifted to bring the crank J in the next or fourth notch, *v*, and bring the secondary driving-wheel *m*, which gears with the register-wheel $k^1$, into gear with D, and thus the movements of D are registered by $k^4$ $k^5$, &c., $k^3$ $k^2$ $k'$ remaining undisturbed as they have been left by the addition of the hundreds, tens, and units columns. In the same way a fifth and sixth column of figures, or more, if the number of registering-wheels, &c., be increased, may be added up, if, as soon as one column has been added, the register frame is shifted to bring another wheel *m* into gear with D. The fitting of the teeth *r* of the wheels *o*, in the manner described, to swing is of considerable importance to the proper operation of the machine, for the reason that if at the termination of the addition of any column a tooth, *r*, is left between two of the teeth of one of the wheels *n n* the said wheel *n*, when moved in the addition of the next column, when said wheel *o* shall have become inoperative, will lift the tooth *r* and let it drop again without disturbing the wheel and thereby altering the registration of the wheels of smaller denomination which have become inoperative.

Y is a box or case inclosing the machine, having suitable doors or lids to open to operate or examine the machine.

What I claim as my invention, and desire to secure by Letters Patent, is—

1. The combination of the repeater X, the stationary repeater stop 17, the sliding stop-bars T′ T², &c., and the stationary stop pin *w*, with the driving-wheel D, or its equivalent, provided with a series of holes, *e e*, the whole operating, substantially as described, to control the motion of the register.

2. Combining the shaft of the driving wheel D, or its equivalent, with the keys S′ S², &c., by means of a stronger spring, Y, and a weaker spring, R, and a lever, 13, deriving motion from the keys, the whole operating substantially as herein described, for the purpose set forth.

3. Combining the keys with the sliding stop-bars T′ T², &c., by means of the wedges 8 8, attached to the keys, the arms U U, sliding on guide-bars V, and the collars 6 6, and springs 7 7, applied to the guide-bars, substantially as and for the purpose specified.

4. The loose teeth *r*, applied to the wheels *o o*, and operating substantially as herein described, for the purpose specified.

5. Making the register movable longitudinally relatively to the driving-wheel D, or its equivalent, substantially as described, for the purpose of changing the driving operation to the register-wheels of different denominations at pleasure.

O. L. CASTLE.

Witnesses:
N. A. BOYER,
A. T. RICHMOND.